(12) United States Patent
Andrews et al.

(10) Patent No.: US 6,664,815 B2
(45) Date of Patent: Dec. 16, 2003

(54) OUTPUT DRIVER CIRCUIT WITH CURRENT DETECTION

(75) Inventors: Howard Paul Andrews, Sandia park, NM (US); Alma S. Anderson, Rio Rancho, NM (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/733,747

(22) Filed: Dec. 8, 2000

(65) Prior Publication Data

US 2002/0070764 A1 Jun. 13, 2002

(51) Int. Cl.[7] ................................................ H03K 5/22
(52) U.S. Cl. ......................... 327/72; 327/84; 327/111
(58) Field of Search ........................... 327/50, 52, 56, 327/74, 72, 63, 78–81, 84, 108–112, 588; 326/82, 30, 83–86, 89–90; 307/412; 340/635

(56) References Cited

U.S. PATENT DOCUMENTS

| 3,887,864 A | * | 6/1975 | Knudsen | 323/270 |
| 5,491,402 A | * | 2/1996 | Small | 323/282 |
| 5,666,078 A | * | 9/1997 | Lamphier et al. | 327/108 |
| 5,859,545 A | * | 1/1999 | Thornblad | 326/90 |
| 6,078,978 A | * | 6/2000 | Suh | 710/129 |
| 6,417,776 B1 | * | 7/2002 | Tagishi | 340/635 |

* cited by examiner

*Primary Examiner*—Minh Nguyen
(74) *Attorney, Agent, or Firm*—Michael Schmitt

(57) ABSTRACT

An output driver circuit that can be used to determine whether a repeater buffer is the only device driving a bus low. According to the invention, the current through the output driver circuit of the repeater buffer is compared with a reference current. If that current is greater than the reference current, then the output driver circuit (i.e., the repeater buffer) is the only output driving the bus low. On the other hand, if that current is less than the reference current, then the output driver circuit (and thus the repeater buffer) is not the only device driving the bus low. This information can be used in an I²C repeater to determine the proper response of the repeater and prevent a latch condition.

10 Claims, 5 Drawing Sheets

OUTPUT DRIVER CIRCUIT WITH CURRENT DETECTION

BACKGROUND OF THE INVENTION

This invention relates to the field of electronics, and in particular to a device that facilitates the interconnection of devices using an I²C interface.

The Inter Integrated Circuit (I²C) bus is an industry standard bus interface developed by Philips Corporation, which allows integrated circuits to communicate directly with each other via a simple bi-directional 2-wire bus. Interfacing devices in an I²C based system can be achieved by directly connecting them to the two bus lines: a serial data line (SDA) for the communication of data, and a serial clock line (SCL) for the control and synchronization of the communication of data between the devices.

FIG. 1 shows a block diagram of an I²C repeater 1 having one channel (SDA or SCL). In a typical I²C bus, another identical circuit as that in FIG. 1 is used for the other channel (SCL or SDA as the case may be). Repeater 1 is a device that allows separation of two I²C bus segments, segments A and B, by electrically isolating the two segments and repeating signals from one segment to the other. Each segment is of a wired-OR type. All devices on the bus are open-collector/open-drain devices and are only capable of driving the bus to a low state (about 0 volts). An external pull-up resistor pulls the bus high (about Vdd) when no device is driving it low. A main drawback with this type of repeater is that it can latch into a low state. For example, if segment A is driven low, repeater 1 will drive segment B low through buffer 10. This low on segment B caused by buffer 10 must not cause buffer 20 to drive segment A low; otherwise a latch condition will occur. Also, buffer 20 cannot be turned off because any device on segment B can drive segment B low, in which case buffer 20 must drive segment A low.

Therefore, there is a need for a scheme that can effectively determine whether a repeater buffer, e.g., buffer 10, is the only device driving a bus low, so as to prevent any latch condition.

SUMMARY OF THE INVENTION

The present invention provides an output driver circuit that can be used to determine whether a repeater buffer is the only device driving a bus low. According to the invention, the current through the output driver circuit is compared with a reference current. If that current is greater than the reference current, then the output driver circuit (and hence the repeater buffer) is the only output driving the bus low. On the other hand, if that current is less than the reference current, then the output driver circuit is not the only device driving the bus low. This information can be used in an I²C repeater to determine the proper response of the repeater and prevent a latch condition.

According to a first embodiment of the present invention, an output driver circuit for connecting to a bus is provided. The circuit comprises a first output driver connected to the bus; a second output driver for generating a reference current; and a comparator, connected to the first and second output drivers, for comparing current flowing through the first output driver with the reference current to determine whether there is an external device driving the bus.

According to one aspect of the first embodiment of the invention, the first output driver includes a first resistor and a first transistor, and the second output driver includes a second resistor and a second transistor.

According to another aspect of the first embodiment of the invention, the first resistor is slightly larger than the second resistor in value and the first and second transistor are substantially identical.

According to a second embodiment of the invention, an output driver circuit for connecting to a bus is provided. The circuit comprises a parallel circuit including first is and second paths, the first path for connecting to the bus; a transistor connected to the parallel circuit in series; and a comparator, connected to first and second paths, for comparing currents flowing through the two paths to determine whether there is an external device driving the bus.

According to one aspect of the second embodiment of the invention, the first path includes first and second resistors, and the second path includes third and fourth resistors.

According to another aspect of the second embodiment of the invention, the first path is a low impedance path, and the second path is a high impedance path. Furthermore, the first, second, third and fourth resistors are scaled such that, when there are no external devices driving the bus, the comparator detects a predetermined difference between the currents flowing through the two paths.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
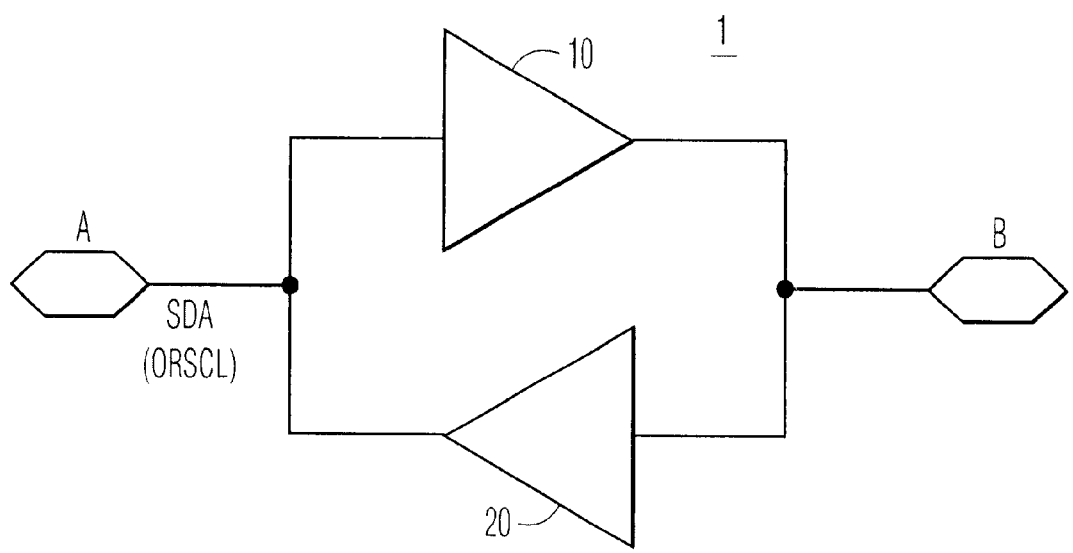
FIG. 1 shows a block diagram of a standard I2C repeater having one channel.
Figure 2:
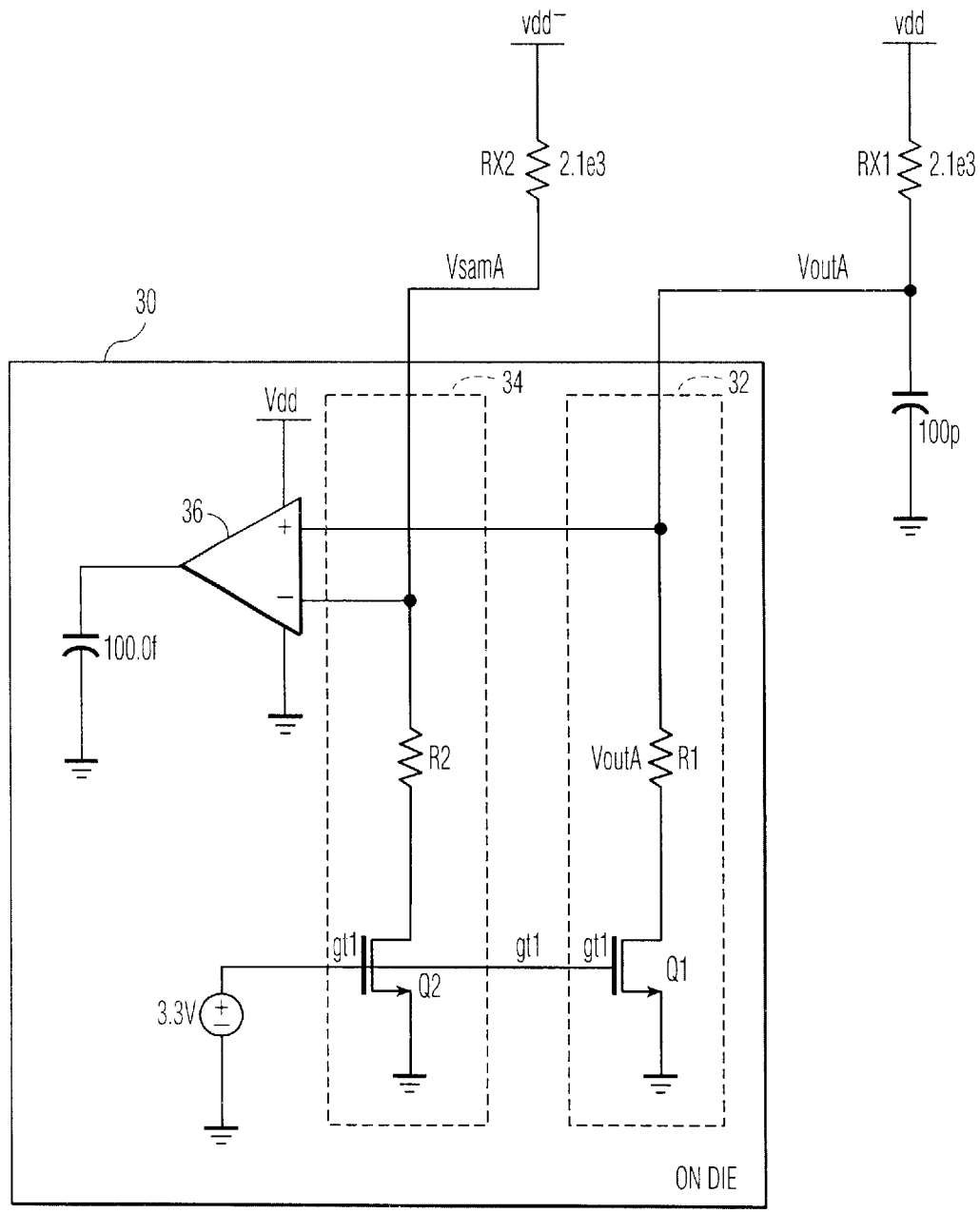
FIG. 2 illustrates an output driver circuit according to a first embodiment of the present invention.

FIG. 2 illustrates an output driver circuit 30 according to a first embodiment of the present invention. Circuit 30 is the output stage of a buffer (e.g., buffer 10 or 20 in FIG. 1). For example, in the case of buffer 20, VoutA corresponds to the voltage at bus segment A in FIG. 1. In the case of buffer 10, VoutA corresponds to the voltage at bus segment B in FIG. 1.

In FIG. 2, circuit 30 comprises an output driver 32, a replica driver 34, and a comparator 36 in the form of an op-amp, for example. Output driver 32 includes a drain resistor R1 and an NMOS transistor Q1. Replica driver 34 includes a drain resistor R2 slightly less than R1 and an NMOS transistor Q2 identical to Q1. Replica output driver 34 is used for generating a reference current, as will be discussed below.

When the gate voltage (at node gt1) of transistors Q1 and Q2 goes high, both the transistors will turn on and pull their outputs low. As the output goes low, the drain-source voltage of each transistor becomes less than the gate-source voltage and will enter into the linear region of operation, thus behaving like a resistor. Since the transistors Q1 and Q2 are identical and have identical gate-source voltages they will tend to have identical behavior and identical resistance values. This resistor behavior improves as the drain-source voltage decreases. Therefore, the current through transistors Q1 and Q2 will be identical if they have identical loads, assuming that the resistance values of the two transistors are identical. Loads for the transistor Q1 are R1 and R×1 while the loads for transistor Q2 are R2 and R×2. Load resistors R×1 and R×2 are chosen to be identical. By selecting R2<R1, a slightly different current will flow through transistors Q1 and Q2. This current difference is measured as a voltage difference across resistors R1 to ground and R2 to ground. When output driver circuit 30 is the only device driving the bus low, the voltage VoutA seen at R1 will be greater than the voltage VsamA at R2. This voltage difference is detected by comparator 36. Thus, when node gt1 goes high, the output of comparator 36 also goes high, indicating that output driver circuit 30 (i.e., the buffer) is the only output device driving the bus.

Figure 3:
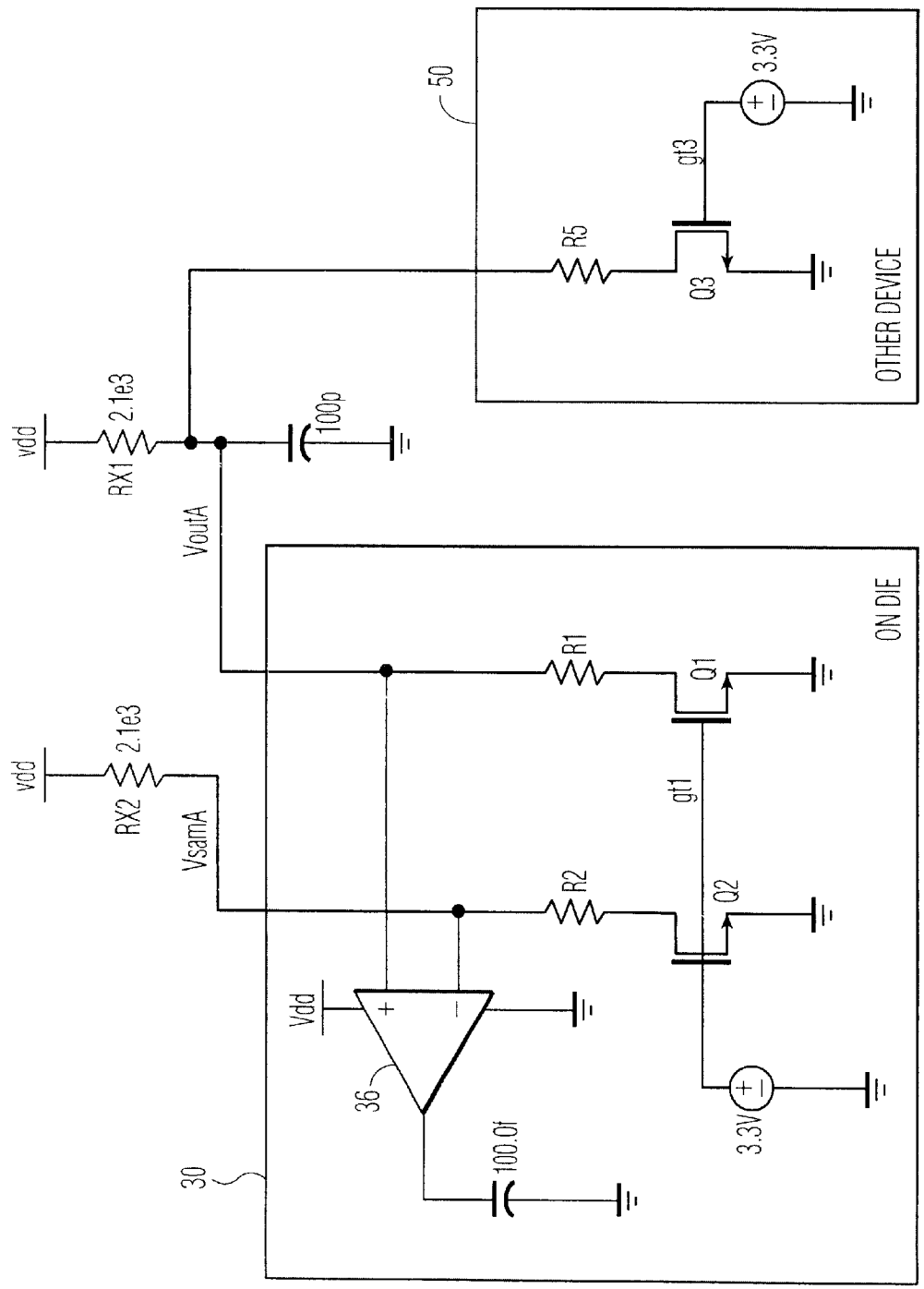
FIG. 3 shows the output driver circuit of FIG. 2 along with an additional device.

If the output driver circuit 30 is not the only device driving the bus low because of an additional device 50 as illustrated in FIG. 3, less current will flow through R1 and the voltage seen VoutA at R1 will be less than the voltage VsamA at R2. This voltage difference is also detected by comparator 36. The change in voltage at R1 due to current sharing on the bus is used to determine if output driver circuit 30 (and thus the repeater buffer) is the only device driving the bus. Thus, in FIG. 3, when node gt1 goes high while node gt3 is still low, it indicates that output driver circuit 30 (i.e., the buffer) is the only device driving the bus low and the output of comparator 36 is high. When nodes gt1 and gt3 both go high, it indicates that there is an additional device 50 driving the bus low, and the output of comparator 36 goes low.

Figure 4:
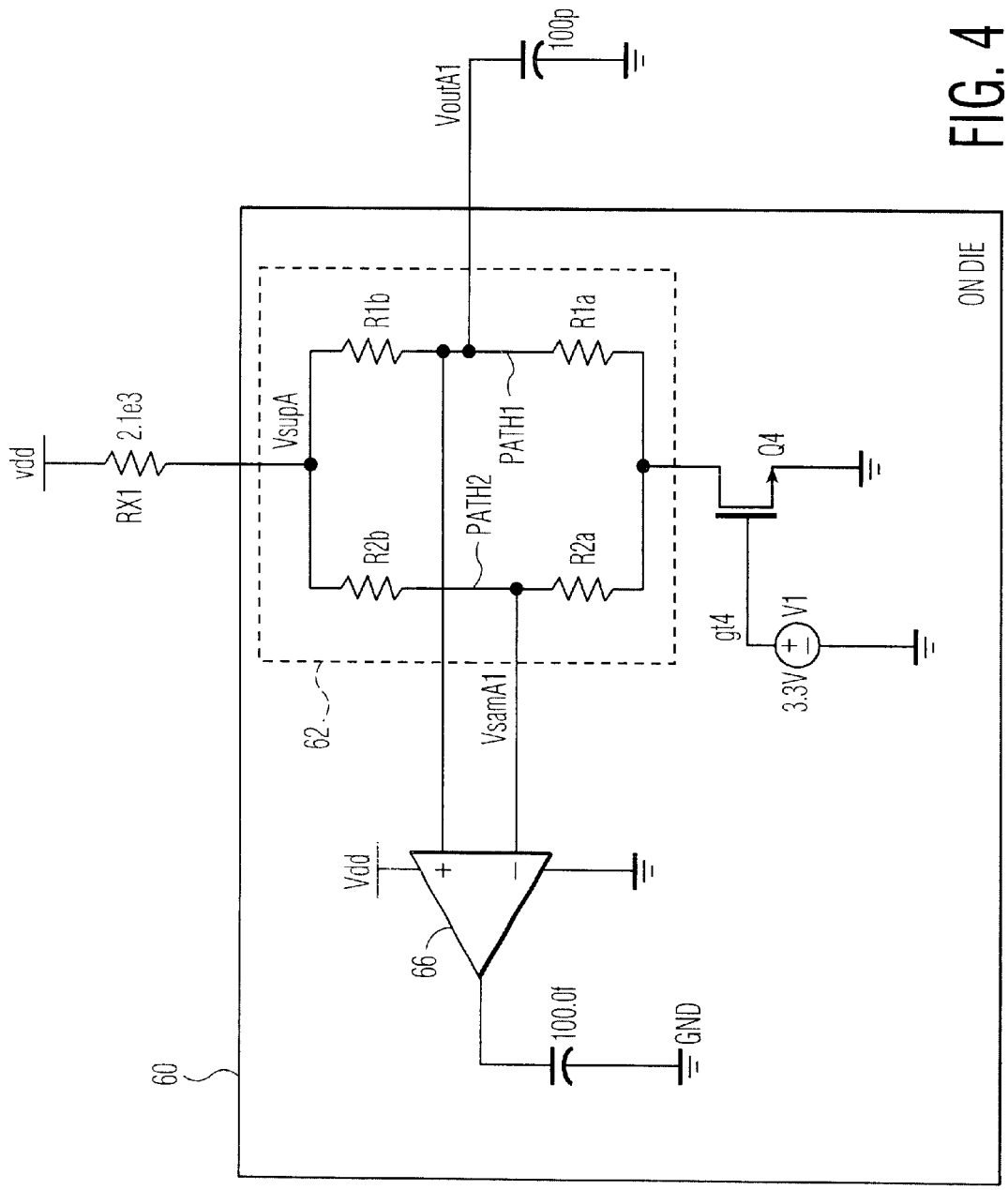
FIG. 4 illustrates an output driver circuit according to a second embodiment of the present invention.

FIG. 4 shows an output driver circuit 60 according to a second embodiment of the present invention. Like circuit 30, circuit 60 is the output stage of a buffer (e.g., buffer 10 or 20 in FIG. 1). Similarly, in the case of buffer 20, VoutA1 corresponds to the voltage at bus segment A in FIG. 1. In the case of buffer 10, VoutA1 corresponds to the voltage at bus segment B.

In FIG. 4, circuit 60 comprises a parallel circuit 62, an NMOS transistor Q4 and a comparator 66. Parallel circuit 62 includes two paths: path 1 and path 2. The current through output transistor Q4 is divided between the two paths. The currents through these paths are compared in the form of voltage drops by comparator 66 to determine if output driver circuit 60 (i.e., the buffer) is the only device pulling the bus (i.e., VoutA1) low. When transistor Q4 is ON, the drain current of Q4 is the sum of the currents through the two paths. Path1 is a low impedance path including resistors R1a and R1b. Path 2 is a high impedance path including resistor R2a and R2b. In a specific example, R1a and R1b each have a value of 20 ohms, and R2a and R2b each have a value of 10 kohms. The resistors in path 2 need not be equal in value to create a fixed voltage offset for comparator 66. In this fashion, when output drive transistor Q4 is ON and output driver circuit 60 (i.e., the buffer) is the only device driving the bus low, the current through R1a is equal to the current through R1b and a voltage level VoutA1 at R1a is set. Since the current through R2a always equals the current through R2b, these two resistors can be scaled such that the voltage VsamA1 at R2a is lower than the voltage at R1a VoutA1. Thus, when node gt4 goes high, the output of comparator 66 goes high, indicating that output driver circuit 60 (i.e., the buffer) is the only output device driving the bus.

Figure 5:
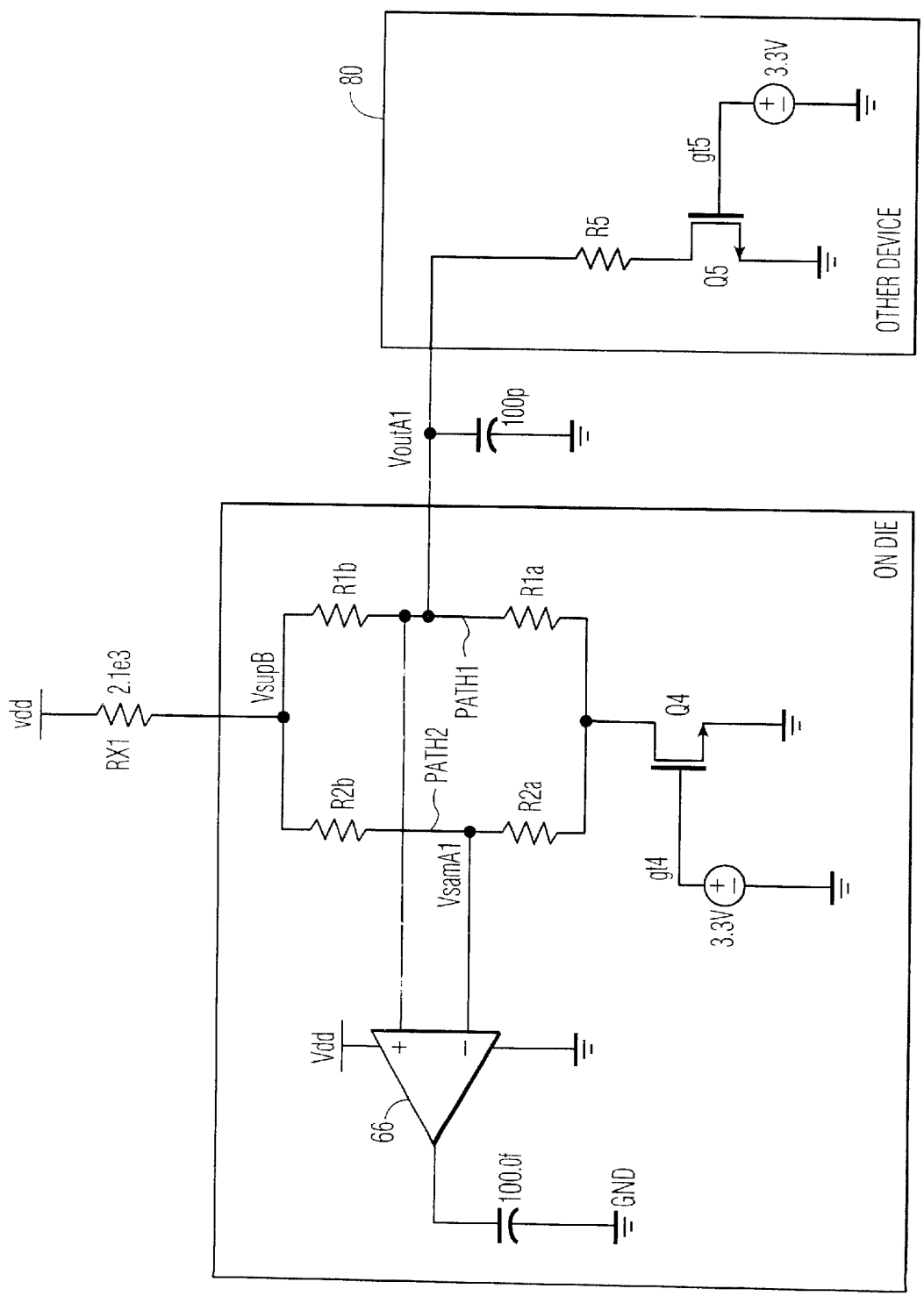
FIG. 5 shows the output driver circuit of FIG. 4 along with an additional device.

When another device 80 is also driving the bus low as shown in FIG. 5, the current through R1b is greater than the current through R1a. This will cause the voltage level VoutA1 at R1a to drop below the level, VsamA1, set at R2a, which can be detected by comparator 66, as shown in FIG. 5. This change in voltage at R1a due to current sharing on the bus is used to determine if output driver circuit 60 (i.e., the buffer) is the only device driving the bus. Thus, in FIG. 5, when node gt4 goes high while node gt5 is still low, it indicates that output driver circuit 60 (and thus the buffer) is the only device driving the bus low and the output of the comparator 66 is high. When nodes gt4 and gt5 both go high, it indicates that there is an additional device 80 driving the bus low and the output of comparator 66 goes low.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. An output driver circuit for connecting to a bus, comprising:
    a parallel circuit including a first path having a first intermediate node and a second path having a second intermediate node;
    a switching element connected in series between the parallel circuit and ground;
    a comparator connected to the first intermediate node and the second intermediate node; and
    a time-invariant load coupled in series between a first power supply node and the parallel circuit;
    wherein the first intermediate node is coupled to a capacitive load, and wherein the first intermediate node is the output node of an output buffer.

2. The circuit of claim 1,
    wherein the first path includes first and second resistors; and
    wherein the second path includes third and fourth resistors.

3. The circuit of claim 2,
    wherein the first path is a low impedance path;
    wherein the second path is a high impedance path.

4. The circuit of claim 2, wherein the first, second, third and fourth resistors are scaled such that, when there are no external devices driving the bus, the comparator detects a predetermined difference between the currents flowing through the two paths.

5. The circuit of claim 1, wherein the bus is an I²C bus.

6. A method for detecting whether there is an external device driving a bus, comprising:
    providing a parallel circuit including a first path having a first intermediate node and a second path having a second intermediate node, and a time-invariant load connected between a first power supply node and the parallel circuit;

driving a bus from the first intermediate node;

operating a transistor connected in series between the parallel circuit and ground to provide conduction between the parallel circuit and ground;

comparing, with a comparator, currents flowing through the two paths; and determining whether there is an external device driving the bus based on a difference between the two currents.

7. The method of claim 6, wherein the first path includes first and second resistors; and wherein the second path includes third and fourth resistors.

8. The method of claim 7, wherein the first path is a low impedance path;

wherein the second path is a high impedance path.

9. The method of claim 7, wherein the first, second, third and fourth resistors are scaled such that, when there are no external devices driving the bus, the comparator detects a predetermined difference between the currents flowing through the two paths.

10. The method of claim 6, wherein the bus is an $I^2C$ bus.

* * * * *